United States Patent [19]

Lainchbury et al.

[11] 4,012,867

[45] Mar. 22, 1977

[54] GROWTH OF PLANTS

[75] Inventors: David Lindsay Guy Lainchbury, Surbiton; John Edward Preedy, Croydon, both of England

[73] Assignee: The British Petroleum Company Limited, London, England

[22] Filed: Apr. 8, 1976

[21] Appl. No.: 675,168

[30] Foreign Application Priority Data

Apr. 9, 1975  United Kingdom ............ 14546/75

[52] U.S. Cl. .................................. 47/17; 55/385 R; 428/178; 52/2; 52/86; 47/29
[51] Int. Cl.[2] ........................................ A01G 9/00
[58] Field of Search ............ 47/58, 17, 1.2, 26–29; 55/385 R, 385 A; 52/2, 63, 86; 428/34, 166, 178–179, 188

[56] References Cited

UNITED STATES PATENTS

| | | | |
|---|---|---|---|
| 2,782,794 | 2/1957 | White | 47/28 X |
| 2,910,994 | 11/1959 | Joy | 47/28 UX |
| 3,389,510 | 6/1968 | Stock | 52/2 |
| 3,741,631 | 6/1973 | Laing | 47/17 X |
| 3,769,763 | 11/1973 | Kwake | 52/2 |

*Primary Examiner*—Robert E. Bagwill
*Attorney, Agent, or Firm*—Brooks Haidt Haffner & Delahunty

[57] ABSTRACT

A greenhouse cloche etc comprising an outer light transmitting wall relatively impermeable to carbon dioxide and an inner light transmitting wall relatively permeable to carbon dioxide and gas admitting means for introducing carbon dioxide gas into the space between the inner and outer walls.

19 Claims, 4 Drawing Figures

GROWTH OF PLANTS

The present invention relates to a method of promoting the growth of plants and to articles for use in the method.

It is known to use double walled plastic sheets inflated by air to provide protection, including thermal insulation, for growing plants. The growth of plants can be stimulated by maintaining an atmosphere enriched in carbon dioxide above them.

According to the present invention a method for promoting the growth of plants comprises (a) growing the plants within an closed plant-enclosing structure having a light transmitting outer wall relatively impermeable to carbon dioxide and an inner light-transmitting wall relatively permeable to carbon dioxide, the inner and outer walls being spaced apart to enclose a closed gas space, (b) and feeding carbon dioxide into the closed gas space.

According to another aspect of the present invention there is provided a closed structure for enclosing plants which comprises a light-transmitting outer wall relatively impermeable to carbon dioxide and an inner light-transmitting wall relatively permeable to carbon dioxide and gas-admitting means for introducing, between the inner and outer walls, carbon dioxide gas.

According to a further aspect of the present invention there is provided a light-transmitting closed panel suitable for use in the production of a closed plant-protecting structure, one wall of the panel being relatively impermeable to carbon dioxide and the opposed wall of the panel being relatively permeable to carbon dioxide, the panel having gas-admitting means for introducing, between the two walls, carbon dioxide gas.

The 'closed' plant-protecting structure of the present invention is one which can be sufficiently closed off from the outside atmosphere to prevent a loss of heat sufficient to nullify the thermal insulation provided by the double wall and to allow a carbon dioxide partial pressure above that in the atmosphere to be maintained. Similarly the 'closed' gas space between the inner and outer walls is one which is sufficiently cut off from the exterior and interior of the plant enclosing structure to allow the gas within the space to provide a useful degree of thermal insulation and to allow a partial pressure of carbon dioxide above that within the plant-enclosing structure to be maintained within the gas space enclosed between the inner and outer walls.

The wall which is "relatively impermeable" to carbon dioxide allows only a relatively small proportion of any carbon dioxide fed to the closed gas space to diffuse into the atmosphere outside, preferably not more than 0.1% by weight. The relatively permeable wall is one which is permeable relative to the outer wall.

The average concentration of carbon dioxide above the plants in a 24 hr. period in the method of the present invention is preferably at least double the normal $CO_2$ level in the atmosphere.

The height of the plant-enclosing structure may be relatively small so that it can be used as a cloche or cold-frame. Alternatively the structure may be large to allow human beings to enter so that it can be used as a greenhouse.

Where the plant-protecting structure is made up of a plurality of panels it will be understood that the inner and outer walls of the structure will not be continuous but will be constituted by the inner and outer walls of the panels.

The panel may be a rigid panel which may be clipped together with other panels or mounted on a frame to give the plant-enclosing structure.

However, it is preferred to make the panel of sheets of flexible material joined together so as to be capable of inflation by passing gas into the panel through the gas admitting means. It is further preferred to provide connections between the opposed walls of the panel so that on inflation the panel has a slab-like appearance rather than tending to take up a spherical form. An advantage of the use of an inflatable panel is that by altering the degree of inflation the gap between the opposed walls and so the degree of insulation can be altered.

The plant-enclosing structure of the present invention may be constructed by connecting together a plurality of panels to form the walls and roof of the structure. However, where an inflatable panel is made from flexible sheets of material the plant-enclosing structure may be constructed by disposing a single panel over a supporting frame. The space within the plant-enclosing structure may be enclosed entirely by the panel. It may be more convenient, however, to dispose the panel so as to form a passage having an inverted V- or U-shaped cross-section and to provide a separate closures for the ends of the passage.

The plant-enclosing structure may be maintained upright by means of a rigid framework supporting the walls. The walls may themselves be made of material sufficiently rigid to maintain the structure upright without any framework. As a further alternative when the walls of the structure are flexible it may be kept upright by maintaining a pressure within the structure above atmospheric pressure. Alternatively sufficient pressure may be maintained in the gas space between the inner and outer walls of the structure when these are of flexible material to provide sufficient rigidity to maintain the structure upright. Thus it may also be possible using inflatable panels to give the panel sufficient rigidity, by inflating the panel, to maintain the structure.

The preferred inflatable panel may be constituted from two sheets of the same light-transmitting flexible plastics material which has a low permeability to carbon dioxide, the necessary increase in permeability in one wall being achieved by mechanically forming very small pores in the sheet constituting that wall so that gas diffuses more rapidly through that sheet. The size and number of such pores should not, however, be such that the panel cannot be maintained in an inflated condition by the gas supply available.

It is preferred, however, to make one wall of the panel from a flexible sheet of plastics material which has a low permeability to carbon dioxide and the opposed wall from a material that inherently has a higher permeability to carbon dioxide. An example of a suitable material for the wall which is relatively impermeable to carbon dioxide is polyvinyl chloride having a thickness between 25 $\mu$m and 250 $\mu$m e.g. 125 $\mu$m while a suitable material for the wall which is relatively permeable to carbon dioxide is oriented low density polyethylene having a thickness between 12 $\mu$m and 125 $\mu$m e.g. 25 $\mu$m.

The wall which is relatively permeable to carbon dioxide may, for example, be between 50 and 1,000 times, for example 500 times more permeable to carbon dioxide than the wall which is relatively permeable to carbon dioxide.

The permeability of the wall which is relatively impermeable to carbon dioxide is preferably less than $9 \times 10^{-10}$ kg/m$^2$/sec, more particularly $1.6 \times 10^{-10}$ kg/m$^2$/sec under the conditions to which the wall is subjected in use.

Where the structure comprises an inflatable panel the panel may be inflated solely by carbon dioxide gas, the panel being connected to a cylinder of carbon dioxide gas to compensate for the total loss of gas from the panel. Alternatively if the panel is substantially impermeable to oxygen or nitrogen it may be inflated with say air and only sufficient carbon dioxide need be fed to the panel to maintain the partial pressure of carbon dioxide within the panel at the level, above that in the atmosphere outside, required to give the desired partial pressure of carbon dioxide within the plant-enclosing structure. The partial pressure of carbon dioxide required in the panel for any given partial pressure of carbon dioxide in the plant-enclosing structure will depend on the absolute permeability of the relatively permeable wall, the relative permeability of the two walls and the extent to which carbon dioxide can escape from the structure.

The gas-admitting means used in the present invention may be a pipe leading into the gas space between the inner and outer wall. This pipe may be provided with a connector at the end outside the gas-space for attaching a source of carbon dioxide. Alternatively a connection may be provided directly in the inner or outer wall by which a source of carbon dioxide may be connected to the gas space between the walls.

The source of carbon dioxide may be a cylinder of carbon dioxide. Alternatively waste flue gas may be used.

The rate at which the carbon dioxide passes through the wall which is relatively permeable to carbon dioxide depends not only on the permeability of the wall but also on the carbon dioxide pressure differential across the wall. It may be desirable to provide apparatus for controlling the carbon dioxide pressure in the space between the inner and outer walls in accordance with the temperature in the interior of the plant-enclosing structure.

A particularly advantageous feature of the present invention is that many of the plastics materials which have an inherently high permeability to carbon dioxide show an increase in permeability when the temperature rises. Thus when the inner wall of the plant-enclosing structure is made from such a material a larger quantity of carbon dioxide can pass through the wall into the interior of the plant-enclosing structure at times when the temperature is high. At such times the sunlight is usually bright and the plants are growing most rapidly and have the greatest need for carbon dioxide.

A further advantage of the present invention is that the carbon dioxide is released into the plant-enclosing structure over the whole area of the wall which is relatively permeable to carbon dioxide. This gives a more uniform distribution of carbon dioxide in the interior of the plant-enclosing structure.

The invention will now be illustrated by reference to the accompanying drawings in which FIG. 1 is a perspective view of a greenhouse with the double walled plastics covering partially cut away;

Figure 1:
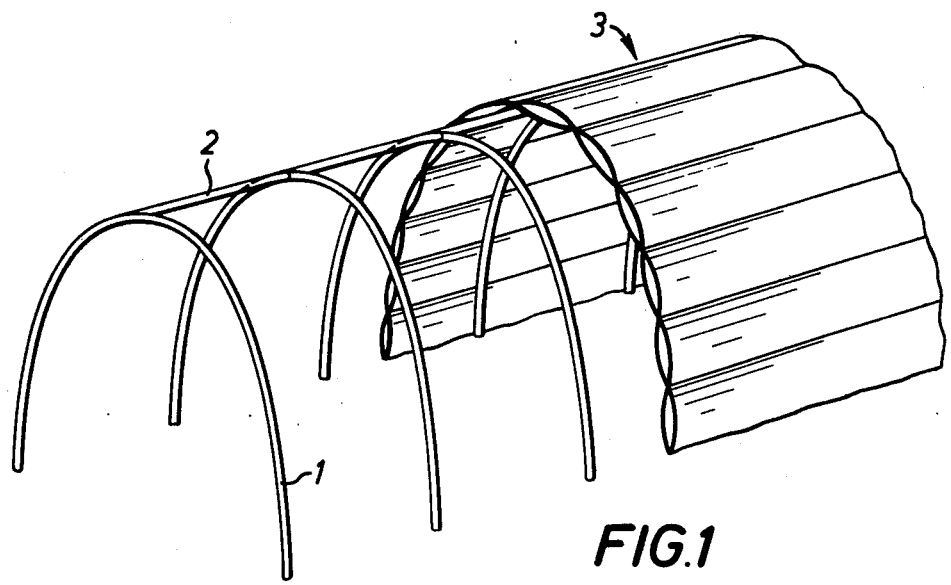
Figure 2:
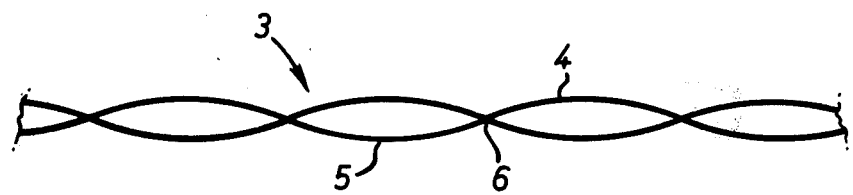
FIG. 2 is a cross-section of a small portion of the double walled plastics covering of the greenhouse shown in FIG. 1.

FIG. 1 shows a greenhouse constructed from a plurality of support frames 1 each in the form of an inverted U and whose ends are buried in the ground. The support frames are linked by a connecting beam 2. A double walled covering 3 of quilted construction is placed over the frames. This covering is made (as is shown in more detail in FIG. 2) from an outer film 4 of transparent polyvinyl chloride 125 $\mu$m thick and an inner film 5 of transparent low density polyethylene 25 $\mu$m thick. The films are joined along lines 6 to give a quilted sheet. The separation between the lines of contact 6 may be for example 2 feet. The outer and inner plastics films are sealed together at each end of the greenhouse to give a gas-tight space between the two plastics films. Means are provided (not shown) for introducing carbon dioxide into each of the sections to which the outer covering is divided. Walls of glass or plastics (not shown) are provided in each end of the greenhouse and the lower ends of the outer plastics covering are buried in a trench surrounding the greenhouse so as to seal the interior of the greenhouse.

Figure 3:
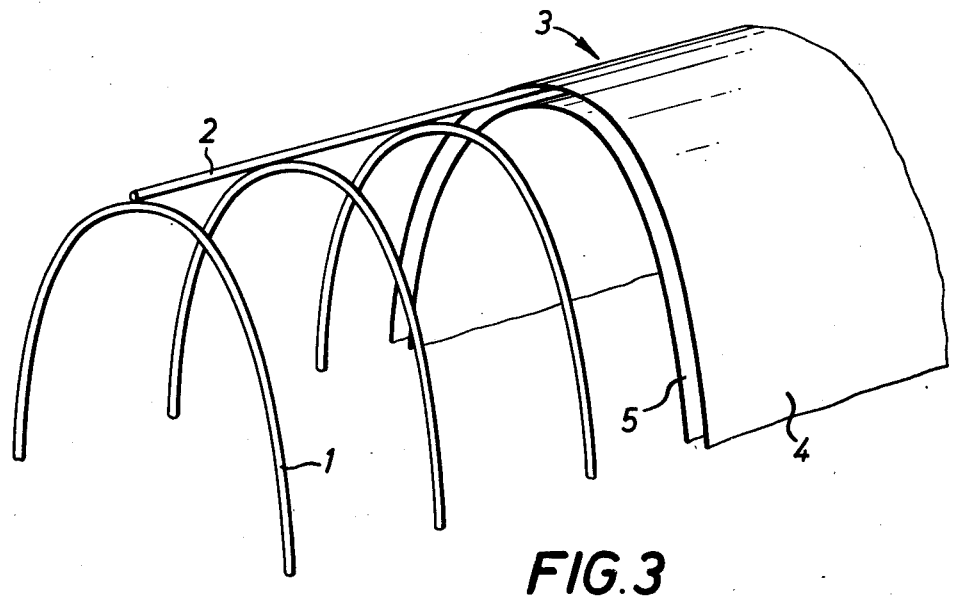
FIG. 3 is a perspective view of another form of a greenhouse according to the invention with the double walled plastics covering partially cut away.

FIG. 3 shows another form of greenhouse according to the invention. This has support frames 1 whose ends are buried in the ground and a connecting beam 2 which connects the frames 1 together and a covering 3 of double walled plastics film disposed over the support frames. The outer plastics film 4 is of transparent polyvinyl chloride 125 $\mu$m thick and the inner layer 5 is of transparent low density polyethylene 25 $\mu$m thick. The inner and outer plastics films are not quilted together as in FIG. 1 but are separated by the connecting beam 2. Apart from the arrangement of the plastics films the greenhouse is as described for FIG. 1.

Figure 4:
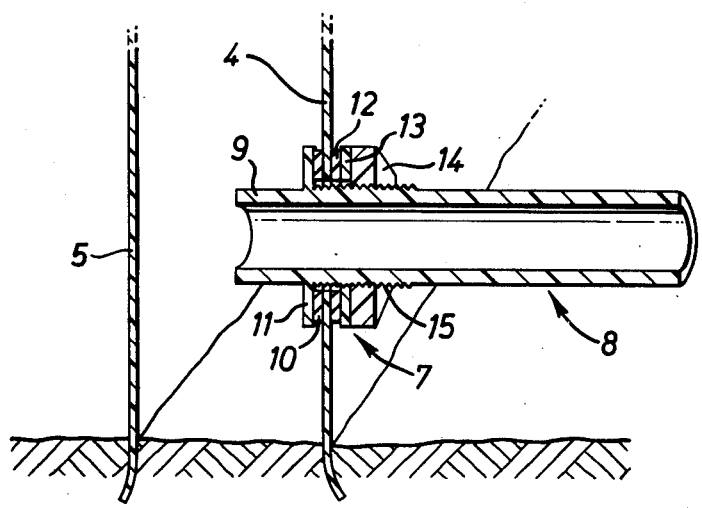
FIG. 4 is a cross-section of a pipe connection for admitting carbon dioxide into a greenhouse according to FIG. 3.

Means for admitting carbon dioxide gas for use in the greenhouse shown in FIG. 3 is shown in FIG. 4. The connecting means 8 comprises a pipe which projects through the outer wall of the greenhouse so that carbon dioxide introduced into the pipe can enter the gas space between the walls through projecting portion 9. The outer wall surrounding the connector is trapped between gaskets 10 and 12. Gasket 10 bears against a flange 11 fast with the pipe 8. A washer 13 is caused to bear against the gasket 12 by a nut 14 threadably engaged with a screw-threaded portion 15 of the pipe 8.

We claim:

1. A closed structure for enclosing plants which comprises an outer light transmitting wall relatively impermeable to carbon dioxide and an inner light transmitting wall relatively permeable to carbon dioxide and gas-admitting means for introducing between the inner and outer walls, carbon dioxide gas.

2. A closed structure according to claim 1 which is sufficiently large to allow human beings to enter.

3. A device according to claim 1 made of sheets of flexible material joined together so as to be capable of inflation by gas introduced through the gas-admitting means.

4. A device according to claim 3 wherein connections are provided between opposed walls.

5. A device according to claim 1 wherein the opposed walls are constituted from sheets of the same light transmitting flexible plastics material which has a low permeability to carbon dioxide, the permeability of one wall to carbon dioxide being increased by pores formed mechanically in the sheet forming that wall.

6. A device according to claim 1 wherein one wall is formed from a flexible plastics sheet material which has a low permeability to carbon dioxide and the opposed wall from a flexible plastics sheet material which inherently has a higher permeability to carbon dioxide.

7. A device according to claim 6 wherein the wall which is relatively permeable to carbon dioxide is from 50 to 1,000 times more permeable to carbon dioxide than the wall which is relatively impermeable to carbon dioxide.

8. A device according to claim 6 wherein the permeability of the wall which is relatively impermeable to carbon dioxide is less than $9 \times 10^{-10}$ kg/m$^2$/sec under the conditions under to which the wall is subjected in use.

9. A device according to claim 8 wherein the wall which is relatively impermeable to carbon dioxide is made of polyvinyl chloride having a thickness between 25 $\mu$m and 250 $\mu$m.

10. A device according to claim 6 wherein the wall which is relatively permeable to carbon dioxide is made from oriented low density polyethylene having a thickness between 12 $\mu$m and 125 $\mu$m.

11. A light transmitting closed panel suitable for use in the production of a closed plant protecting structure, one wall of the panel being relatively impermeable to carbon dioxide and the opposed wall of the panel being relatively permeable to carbon dioxide, the panel having gas-admitting means for introducing between the two walls, carbon dioxide gas.

12. A device according to claim 11 made of sheets of flexible material joined together so as to be capable of inflation by gas introduced through the gas-admitting means.

13. A device according to claim 12 wherein connections are provided between opposed walls.

14. A device according to claim 11 wherein one wall is formed from a flexible plastics sheet material which has a low permeability to carbon dioxide and the opposed wall from a flexible plastics sheet material which inherently has a higher permeability to carbon dioxide.

15. A device according to claim 11 wherein the wall which is relatively permeable to carbon dioxide is from 50 to 1,000 times more permeable to carbon dioxide than the wall which is relatively impermeable to carbon dioxide.

16. A device according to claim 14 wherein the permeability of the wall which is relatively impermeable to carbon dioxide is less than $9 \times 10^{-10}$ kg/m$^2$/sec under the conditions under which the wall is subjected in use.

17. A device according to claim 14 wherein the wall which is relatively impermeable to carbon dioxide is made of polyvinyl chloride having a thickness between 25 $\mu$m and 250 $\mu$m.

18. A device according to claim 14 wherein the wall which is relatively permeable to carbon dioxide is made from oriented low density polyethylene having a thickness between 12 $\mu$m and 125 $\mu$m.

19. A method for promoting the growth of plants which comprises (a) growing the plants within a closed plant-enclosing structure having a light transmitting outer wall relatively impermeable to carbon dioxide and an inner light transmitting wall relatively permeable to carbon dioxide, the inner and outer walls being spaced apart to enclose a closed gas space and (b) feeding carbon dioxide into the closed gas space.

* * * * *